United States Patent Office

3,340,398
Patented Sept. 5, 1967

3,340,398
DETECTION OF HYDROGEN LEAKS WITH TRITIUM
Joseph Winkler and George V. Melnikov, Sacramento, Calif., assignors to Aerojet-General Corporation, Azusa, Calif., a corporation of Ohio
No Drawing. Filed June 23, 1964, Ser. No. 377,404
3 Claims. (Cl. 250—83)

This invention relates to liquid hydrogen and its use as a fuel for liquid rockets. More specifically, this invention relates to a new composition employing hydrogen in conjunction with a compatible tracer material which is incorporated therein so as to detect leaks of the hydrogen and thereby prevent explosions.

With the advent of modern rocketry, there has become a need for many exotic fuels which, although offering high energy on combustion, are dangerous to work with. Foremost among these exotic fuels is hydrogen which, because it is the lightest of the elements, offers the highest possible theoretical specific impulse when it is burned with an oxidizer.

Liquid hydrogen has a boiling point of −423° F. at atmospheric pressure. Thus, it must be maintained in a closed, insulated system. Because it is the lightest of the elements, it is difficult to contain in its gaseous state since the small size of the hydrogen atom permits its diffusion through various sealing materials.

Mixtures of hydrogen and air are highly explosive over a wide concentration range. Mixtures of hydrogen with air ranging from about 4 percent to about 75 percent hydrogen by volume are flammable such that they are easily ignited by the weakest spark. The difficulty of containing liquid hydrogen plus its ability to form flammable mixtures in combination with air make liquid hydrogen a very dangerous material to store. This is evidenced by the fact that there have been numerous explosions in recent years resulting in both loss of life and property due to leaks of liquid hydrogen from enclosed containers. Often the liquid hydrogen is stored in an enclosed area either in or in close proximity to a missile. Under these conditions, leaks of hydrogen are extremely dangerous since the hydrogen concentration can easily build up to the flammable level within the enclosed area before it can be detected.

There are presently available thermistor-bridge type leak detectors which function by comparing the thermal conductivity of a gas sample with that of the ambient atmosphere. Such devices are, however, not satisfactory in detecting hydrogen leaks since they lack the sensitivity and speed of response which are essential to detect the leak in time to avert a destructive explosion.

It is, therefore, an object of this invention to provide a means whereby hydrogen leaks can be readily detected so as to avoid destructive explosions. A further object is to provide a new composition of matter in which minute quantities of radioactive tracer material are admixed with liquid hydrogen. Further objects will become apparent from a reading of the specification and the claims which follow.

Our invention provides a ready solution to the above problems by admixing minute quantities of a radioactive tracer material with liquid hydrogen so that hydrogen leaks can be readily detected by means of a radiation counter. Liquid hydrogen is somewhat unique in that it has a very low boiling point (−423° F.) and it is highly reactive. Thus, conventional tracer materials are completely unsatisfactory for detecting hydrogen leaks. At a temperature of −423° F., almost all materials are frozen solid. In this state, a tracer material would be of no value in detecting a leak since it would not volatilize and escape through the leak. Further, the use of liquid hydrogen as a rocket fuel imposes the requirement that the liquid hydrogen be capable of being pumped to the combustion zone. The presence of frozen solids within the liquid hydrogen would, of course, present great problems since the solid materials would quickly clog pumps, valves, and small diameter feed lines and cause failure of the rocket engine.

As stated above, liquid hydrogen is frequently stored in enclosed areas in close proximity to a missile. The radioactive tracer material incorporated in to the liquid hydrogen would, therefore, create an extreme health hazard within the area if the rays emitted were of a high intensity. Moreover, a radioactive material whose rays would pass through the walls of the container holding the liquid hydrogen would raise the background radiation count to such a high level that hydrogen leaks could not be readily detected.

We have discovered that the admixing of tritium with liquid hydrogen in an effective concentration sufficient to reveal the presence of a hydrogen leak provides a way of detecting hydrogen leaks prior to the build-up of the hydrogen concentration in air to a flammable level. It has been found that the tritium can be employed at very low concentrations ranging from about 0.1 part per billion to about 10 parts per billion (by weight) although higher concentrations such as 60 parts per billion can be employed if desired. Preferably, a tritium concentration of about 0.4 to 3 parts per billion is employed since this concentration makes for ready detection with available instrumentation at a reasonable cost per unit weight of hydrogen.

Tritium has a boiling point of about −418° F. and is, therefore, completely compatible with liquid hydrogen. Also, the vapor pressure of liquid tritium is very close to that of liquid hydrogen. Thus, when a leak occurs, both the liquid hydrogen and the liquid tritium admixed therewith are readily vaporized so that the leak can be quickly detected by means of a beta ray counter.

At the concentration levels which we employ, the tritium presents no health hazards. Tritium emits beta rays which are weak and have a low power of penetration. Thus, the rays emitted by tritium will not penetrate a metal sheet having a thickness of about 0.002 inch. The beta rays are, therefore, readily confined by the container for holding the hydrogen. Moreover, the confinement of the beta rays by the container keeps the background radiation low such that the slightest hydrogen leak is readily detected. Since tritium is almost as volatile as hydrogen, it escapes as a gas through a leak in the hydrogen system. In the event of a leak, the radioactive tritium can, therefore, be readily dispersed by flushing the area with large quantities of air or other gas. In the case of an underground storage area for the hydrogen, this could be readily accomplished by means of large fans so as to quickly decontaminate the area of any radioactivity.

The half life of tritium is 12½ to 14 years. Thus, it can be satisfactorily employed even though liquid hydrogen is being stored for long periods of time prior to use.

To further illustrate the scope of our invention, there are presented the following examples in which all parts and precentages are by weight unless otherwise indicated.

EXAMPLE I

A stock mixture of hydrogen gas containing 6 p.p.m. of tritium by weight was prepared. This was accomplished by connecting a glass ampoule having a break seal to the glass end of a glass-to-metal seal which was then connected to a 1000 cc. stainless steel pressure vessel. The pressure vessel and the space above the break seal were evacuated to a pressure below 0.0001 mm. of mercury. At this point, the break seal was broken and the tritium gas (100 millicuries) was admitted into the vessel. The vessel was then pressurized with hydrogen gas to a pressure of 300 p.s.i.g. Based on the relative volumes of tritium and hydrogen in the pressure vessel, the tritium concentration in the vessel was calculated as $2.0 \times 10^{-6}$ cc. per cc. of hydrogen gas. The specific activity of the tritium-hydrogen mixture was 4.6 microcuries per cc. of the tritium-hydrogen gas mixture calculated at 20° C. and 760 mm. of mercury.

An evacuated 300 cc. stainless steel pressure vessel was filled to a pressure of 6 inches of mercury (3 p.s.i.a.) from the stock hydrogen-tritium mixture described above. The 300 cc. vessel was then pressurized with hydrogen to a pressure of 300 p.s.i.g. The diluted tritium-hydrogen mixture in the 300 cc. vessel contained 60 parts per billion by weight of tritium and the specific activity of the diluted mixture was 0.046 microcuries per cc.

The 300 cc. vessel containing the diluted tritium-hydrogen mixture was connected through a valve to a U-tube which was partially immersed in a dewar of liquid helium. The U-tube had a valved outlet such that the tube could be closed. The diluted mixture of tritium and hydrogen was slowly bled in from the 300 cc. vessel until the gas pressure within the U-tube ranged between 20 and 30 p.s.i.g. As the pressure dropped within the U-tube, on cooling and liquification of the gas, the flow of gas from the 300 cc. vessel was maintained at a rate sufficient to keep the pressure in the U-tube between 20 and 30 p.s.i.g. The liquification procedure took between 20 to 30 minutes.

When the liquification operation had been completed, the valved outlet from the U-tube was opened such that the liquid tritium-hydrogen mixture was free to evaporate at a controlled rate. The evaporated hydrogen-tritium gas was then fed through a flow meter to a tritium monitor. The tritium monitor was Model No. T-750, made by Radiation Technology, Inc.

The evaporation rate was such as to maintain a flow of about 40 cc. of the hydrogen-tritium mixture per minute through the flow meter into the tritium monitor. A cylinder of compressed nitrogen was also connected through a flow meter to the tritium monitor. The introgen flow rate into the tritium monitor was maintained constant such that the ratio of the tritium-hydrogen gas flow to the nitrogen gas flow was likewise maintained constant.

In Run 1, the nitrogen flow was maintained at 189 cc. per minute. As stated above, the flow of hydrogen-tritium was 40 cc. per minute. It was observed during Run 1 that the tritium activity measured in the tritium monitor remained relatively constant during the entire evaporation of the tritium-hydrogen mixture. This demonstrated that the evaporation of tritium proceeded at the same rate as that of the liquid hydrogen in the U-tube such that there was no evidence of fractionation.

In the two succeeding runs, the tritium-hydrogen flow rate was maintained, as before, at 40 cc. per minute. However, in these runs, the nitrogen flow rate was maintained at 577 cc. per minute. As in Run 1, it was observed that the tritium activity measured in microcuries per cubic meter remained constant throughout the entire evaporation of the liquid mixture of hydrogen and tritium.

When the above run is repeated using other concentrations of tritium from 0.1 to 10 parts per billion, satisfactory results are obtained.

EXAMPLE II

In a subsequent run, the stock mixture of tritium-hydrogen gas, as described in Example I containing 6 p.p.m. of tritium by weight was injected into an evacuated 300 cc. stainless steel pressure vessel until the pressure reached 6 inches of mercury (3 p.s.i.a.). The 300 cc. vessel was then pressurized with hydrogen to a pressure of 320 p.s.i.g. such that the vessel contained about 54 parts per billion by weight of tritium.

The gas mixture was further diluted by evacuating the 300 cc. vessel to a pressure of 7.5 p.s.i.a. and then repressurizing to 325 p.s.i.a. with hydrogen to give a tritium concentration of about 1.2 parts per billion by weight.

The vessel was then evacuated again to a pressure of 2.0 p.s.i.a. at which point it was pressurized with nitrogen to a pressure of 265 p.s.i.a. This gave a hydrogen content of about 0.75 percent by volume with there being about 1.2 parts of tritium per billion parts of hydrogen.

The gas mixture was then run through a Model T-750 Tritium Monitor (manufactured by Radiation Technology, Inc.) at a flow rate between about 200 and 300 ccs. per minute calculated at 20° C. and 760 mm. of mercury. During this run, which lasted for about 24 minutes, the measured specific activity of the gas remained relatively constant at an average level which was 29 percent above the background radiation level.

As shown by the foregoing examples, we have provided a unique composition of matter which eliminates the problems heretofore encountered with hydrogen leaks. Moreover, our compositions are completely compatible with the various oxidizers such as liquid oxygen, nitrogen titroxide, and the like which are employed in liquid rocket engines. This is an important consideration since the tritium remains in the hydrogen and is burned along with it in providing thrust for a rocket engine. During the burning process, the tritium is compatible with the other ingredients which are admixed with the hydrogen during combustion.

Another aspect of our invention is a method for detection of hydrogen leaks which requires sensing the radiation level at several concentrations of hydrogen in air up to a 4 percent concentration which is flammable. The method is simple and can employ commercially available tritium sensors such as the Model 9160 tritium monitor manufactured by Texas Nuclear Corporation, and similar devices manufactured by Electro Nuclear Laboratories, Inc., and Nuclear-Chicago Corporation. These devices are capable of sensing several different radiation levels. Thus, for example, the device can be set to sense the radiation level present when the concentration of hydrogen in air is 2 percent by volume or some lower concentration such as 0.75 percent by volume. This is still a safe level and well below the hydrogen concentration required to produce flammable hydrogen-air mixtures. At this point, the operator is alerted to the fact that there is a hydrogen leak. As the leak continues, the operator can continue looking for it until the radiation sensor signals that the hydrogen concentration in air has reached a higher concentration such as 3 percent. At this point the operator is alerted that the situation is becoming more dangerous as the flammable concentration of hydrogen in air is being approached. As the hydrogen concentration in air reaches the 4 percent level, the radiation sensor tells the operator to evacuate the area and to purge it in order to evacuate the hydrogen-air mixture and prevent an explosion.

The above procedure can, of course, be conducted, to some extent, automatically. For example, the radiation sensor could be electrically connected to a large fan such that the fan would be turned on when the hydrogen concentration reached the dangerous level of 4 percent by volume. Moreover, the radiation sensor could be electrically connected with a bell or siren to signal an alert when the hydrogen leak was first sensed at a lower concentration of hydrogen in air.

Having fully defined our invention in the above description and foregoing examples, we desire to be limited only within the scope of the appended claims.

We claim:

1. A method for detecting leaks of hydrogen from a pressure vessel, said method comprising: (1) admixing tritium with the hydrogen in said vessel such that the tritium content ranges from about 0.1 part per billion to about 10 parts per billion by weight; (2) sensing the radiation level in an area in proximity to the vessel, whereby the presence of a leak is denoted by an increase in the radiation count.

2. The method of claim 1 wherein the tritium level is adjusted to a concentration range between about 0.4 to about 3 parts per billion.

3. The method of claim 1 wherein the radiation count is sensed at a number of radiation levels ranging up to the radiation level equivalent to a flammable concentration of hydrogen in air.

References Cited

UNITED STATES PATENTS 3,000,174  9/1961  Vose _____ 149—87 X
3,114,042  12/1963 Christianson _____ 250—43.5

OTHER REFERENCES

McInteer, LA2086, Los Alamos Scientific Lab., New Mexico, 1954, pp. 30–36.

CARL D. QUARFORTH, *Primary Examiner.*

BENJAMIN R. PADGETT, *Examiner.*

L. A. SEBASTIAN, *Assistant Examiner.*